(12) United States Patent
Wu

(10) Patent No.: US 8,805,391 B2
(45) Date of Patent: Aug. 12, 2014

(54) METHOD OF IMPROVING SEMI-PERSISTENT SCHEDULING RESOURCES RECONFIGURATION IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 13/419,444

(22) Filed: Mar. 14, 2012

(65) Prior Publication Data

US 2012/0172044 A1 Jul. 5, 2012

Related U.S. Application Data

(62) Division of application No. 12/603,549, filed on Oct. 21, 2009.

(60) Provisional application No. 61/109,907, filed on Oct. 30, 2008.

(51) Int. Cl.
*H04W 72/00* (2009.01)
*H04W 4/00* (2009.01)

(52) U.S. Cl.
USPC ........................ 455/452.1; 370/328

(58) Field of Classification Search
USPC ................ 455/450, 452.2; 370/329
See application file for complete search history.

(56) References Cited

U.S. PATENT DOCUMENTS

| 6,983,147 | B1 | 1/2006 | Hans et al. |
| 8,009,606 | B2 | 8/2011 | Seo |
| 2008/0192688 | A1* | 8/2008 | Kuo et al. ............... 370/329 |
| 2010/0081443 | A1* | 4/2010 | Meyer et al. ............ 455/450 |
| 2010/0085927 | A1* | 4/2010 | Torsner et al. .......... 370/329 |
| 2010/0279695 | A1 | 11/2010 | Amirijoo |
| 2011/0002262 | A1* | 1/2011 | Wang et al. ............. 370/328 |
| 2011/0223924 | A1* | 9/2011 | Lohr et al. .............. 455/450 |
| 2012/0207083 | A1 | 8/2012 | Chen et al. |

FOREIGN PATENT DOCUMENTS

| CN | 101155393 A | 4/2008 |
| CN | 101193444 A | 6/2008 |
| WO | 2006114701 A2 | 11/2006 |

OTHER PUBLICATIONS

Ericsson, Configuration of semi-persistant scheduling, Tdoc R2-080088.*
Nokia Corporation, Missing details of semi-persistent scheduling for DL, Sep. 29- Oct. 3, 2008, 3GPP TSG-RAN WG2 Meeting, R2-085071, pp. 1-6.*
Nokia Corporation, Missing details of semi-persistent scheduling for UL, Sep. 29- Oct. 3, 2008, 3GPP TSG-RAN WG2 Meeting, R2-085070, pp. 1-3.*
Nokia Corporation, Explicit Release of SPS Change Request, Oct. 10-14, 2008, 3GPP TSG-RAN2 Meeting #64, xR2-087024, pp. 1-3.*
3GPP TS 36.331 v8.3.0, Sep. 2008.

(Continued)

*Primary Examiner* — Kent Chang
*Assistant Examiner* — Nathan Brittingham
(74) *Attorney, Agent, or Firm* — Winston Hsu; Scott Margo

(57) ABSTRACT

A method of improving semi-persistent scheduling, abbreviated to SPS, resources reconfiguration for a user equipment in a wireless communication system is disclosed. The method comprises receiving a radio resource control, abbreviated to RRC, connection reconfiguration message corresponding to an RRC connection reconfiguration procedure; and forbidding performing SPS resources reconfiguration when the RRC connection reconfiguration procedure is not a handover procedure.

2 Claims, 4 Drawing Sheets

(56) References Cited

OTHER PUBLICATIONS

3GPP TSG-RAN2#63bis R2-085978, Sep. 2008.
3GPP TSG-RAN2#63bis R2-085978-clean, Sep. 2008.
Nokia Corporation,Nokia Siemens Networks:"Indication of persistent allocation for UL", Mar. 31-Apr. 4, 2008,3GPP TSG-RAN WG2 Meeting #61bis, R2-081962, XP050139630, Shenzhen, China.
Ericsson:"Configuration of semi-persistent scheduling",Jan. 14-18, 2008, 3GPP TSG-RAN WG2 Meeting #60bis, Tdoc R2-080088, XP050137981.
Office action mailed on Aug. 15, 2011 for the China application No. 200910208948.5, filed Oct. 30, 2009, p. 1-6.
Huawei, "Clarification on handling of RRCConnectionReconfiguration including the mobilityControlInformation", 3GPP TSG RAN WG2 #63, R2-084329, Aug. 18-22, 2008, Jeju,Korea.
Panasonic: "Configuration for semi-persistent scheduling", 3GPP TSG RAN WG2 #61bis, R2-081575, Mar. 31-Apr. 4, Shenzhen, China, 2008.
Panasonic: "Dedicated L1 resource usage after handover", 3GPP TSG RAN WG2 #62bis, R2-083694, Jun. 30-Jul. 4, Warsaw, Poland, 2008.
Office action mailed on Jul. 11, 2012 for the U.S. Appl. No. 12/603,549, filed Oct. 21, 2009, p. 1-17.
Office action mailed on Mar. 7, 2013 for the China application No. 200910208948.5, filed Oct. 30, 2009, p. 1-8.
Office action mailed on Aug. 7, 2013 for the U.S. Appl. No. 12/603,549, filing date Oct. 21, 2009, p. 1-16.
Notice of Allowance mailed on Dec. 23, 2013 for the U.S. Appl. No. 12/603,549, filing date Oct. 21, 2009.

\* cited by examiner

METHOD OF IMPROVING SEMI-PERSISTENT SCHEDULING RESOURCES RECONFIGURATION IN A WIRELESS COMMUNICATION SYSTEM AND RELATED COMMUNICATION DEVICE

CROSS REFERENCE TO RELATED APPLICATIONS

This application is a divisional application of U.S. application Ser. No. 12/603,549, filed on Oct. 21, 2009, which claims the benefit of U.S. Provisional Application No. 61/109,907, filed on Oct. 30, 2008 and entitled "METHOD AND APPARATUS FOR SEMI-PERSISTENT SCHEDULING RESOURCE RECONFIGURATION IN A WIRELESS COMMUNICATIONS SYSTEM".

BACKGROUND OF THE INVENTION

1. Field of the Invention

The present invention relates to a method utilized in a wireless communication system and communication device thereof, and more particularly, to a method of improving semi-persistent scheduling resources reconfiguration and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of E-UTRAN is given including a radio resource control layer (RRC), a packet data convergence protocol layer (PDCP), a radio link control layer (RLC), a medium access control layer (MAC), and a physical layer (PHY).

In order to utilize shared channel (SCH) resources efficiently, a semi-persistent scheduling (SPS) function is introduced in the LTE system and is used in MAC, for serving upper layer applications which generate semi-static size data periodically, e.g. VoIP services. SPS resources are semi-static resources including physical resource block (PRB), modulation and coding scheme (MCS), and periodicity. Periodicity is configured by RRC, and a valid set of PRBs and MCSs is configured by RRC and selected by a physical downlink control channel (PDCCH) signaling sent from the E-UTRAN. According to current 3GPP specification, there is only an SPS pattern, i.e. periodicity, for frequency division duplex (FDD), and may exist multiple SPS patterns for time division duplex (TDD) so that SPS resources can be reconfigured to add one more SPS pattern.

An RRC connection reconfiguration procedure is used to modify an RRC connection, e.g. to establish/modify/release radio bearers, to perform handover, or to setup/modify/release measurements. When the UE receives an RRC connection reconfiguration message including an information element (IE) "mobilityControlInformation", which includes parameters relevant to network controlled mobility, the UE performs an RRC connection reconfiguration procedure as a handover procedure. In the handover procedure, the UE deactivates any SPS resource if there is any SPS resource active and performs a radio resource configuration procedure in which SPS resources reconfiguration is performed when the RRC connection reconfiguration message includes an IE "radioResourceConfiguration". Therefore, the UE can apply new SPS resources configuration after switching to a target cell. SPS resources reconfiguration intends that SPS cell radio network temporary identifier (SPS C-RNTI) which is the UE specific identity assigned by RRC for activation/modification of SPS resources is changed, periodicity is changed, an SPS pattern is added or removed for TDD, or a valid set of PRBs and MCSs is changed.

In addition, SPS resources may need to be reconfigured due to which a new service is activated or a service is released in the condition except the handover procedure. For example, when a VoIP service is initiated, SPS resources are usually configured for most common VoIP packet size, and when a streaming service is activated during the VoIP service, SPS resources have to be reconfigured with a large transport block size, i.e. PRBs or MCS, or a small SPS periodicity, to serve both the VoIP service and the streaming service simultaneously. The E-UTRAN can activate or modify SPS resources by sending a PDCCH signaling including SPS C-RNTI. However, SPS resources reconfiguration is not clearly specified in the RRC connection reconfiguration procedure which does not include the IE "mobilityControlInformation", such that SPS resources reconfiguration is exactly performed only in the handover procedure.

Note that, for the LTE system, there is a timing issue that activation time of SPS resources is not included in any RRC message, and thus the UE does not know when to switch to new SPS resources. When the UE reconfigures SPS resources in the condition except the handover procedure, the UE may continue using prior SPS resources that are already released to receive transport blocks until receiving the PDCCH signaling, which causes the received transport blocks to be unsuccessfully decoded.

SUMMARY OF THE INVENTION

The present invention therefore provides a method and related communication device for improving SPS resources reconfiguration.

A method of improving semi-persistent scheduling, abbreviated to SPS, resources reconfiguration for a user equipment in a wireless communication system is disclosed. The method comprises receiving a radio resource control, abbreviated to RRC, connection reconfiguration message corresponding to an RRC connection reconfiguration procedure; and forbidding performing SPS resources reconfiguration when the RRC connection reconfiguration procedure is not a handover procedure.

A method of improving semi-persistent scheduling, abbreviated to SPS, resources reconfiguration for a user equipment in a wireless communication system is disclosed. The method comprises receiving a radio resource control, abbreviated to RRC, connection reconfiguration message corresponding to an RRC connection reconfiguration procedure; and when the RRC connection reconfiguration message includes SPS resources reconfiguration and the RRC connection reconfiguration procedure is not a handover procedure, considering the RRC connection reconfiguration message invalid and performing an RRC connection re-establishment procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
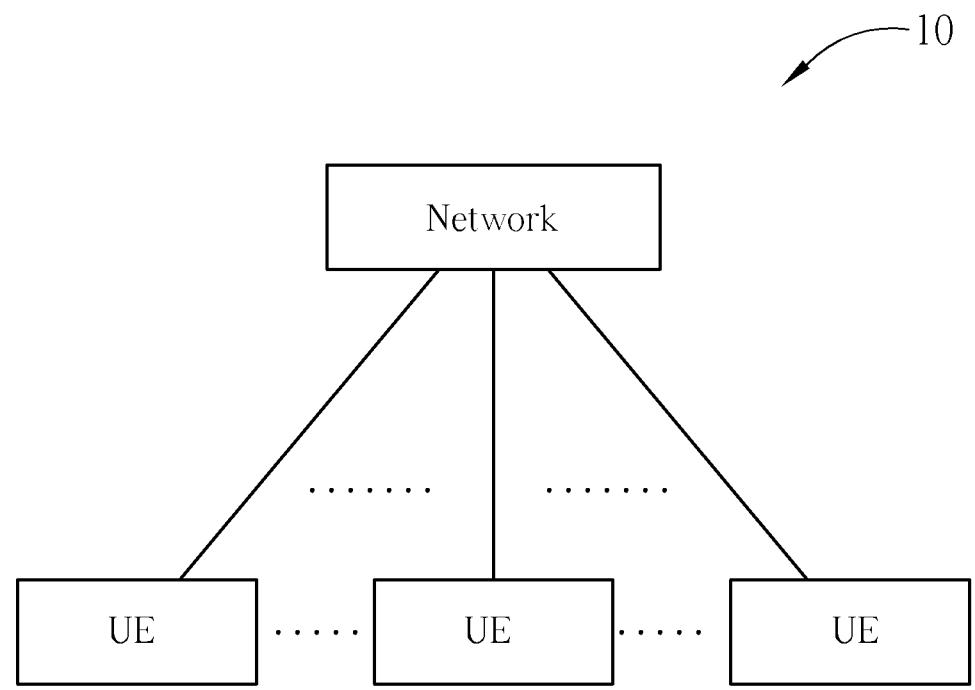
FIG. 1 is a schematic diagram of a wireless communication system.

Please refer to FIG. 1, which is a schematic diagram of a wireless communication system 10. The wireless communication system 10 can a long-term evolution (LTE) system or other mobile communication systems, and is briefly composed of a network and a plurality of user equipments (UEs), as the structure illustrated in FIG. 1. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
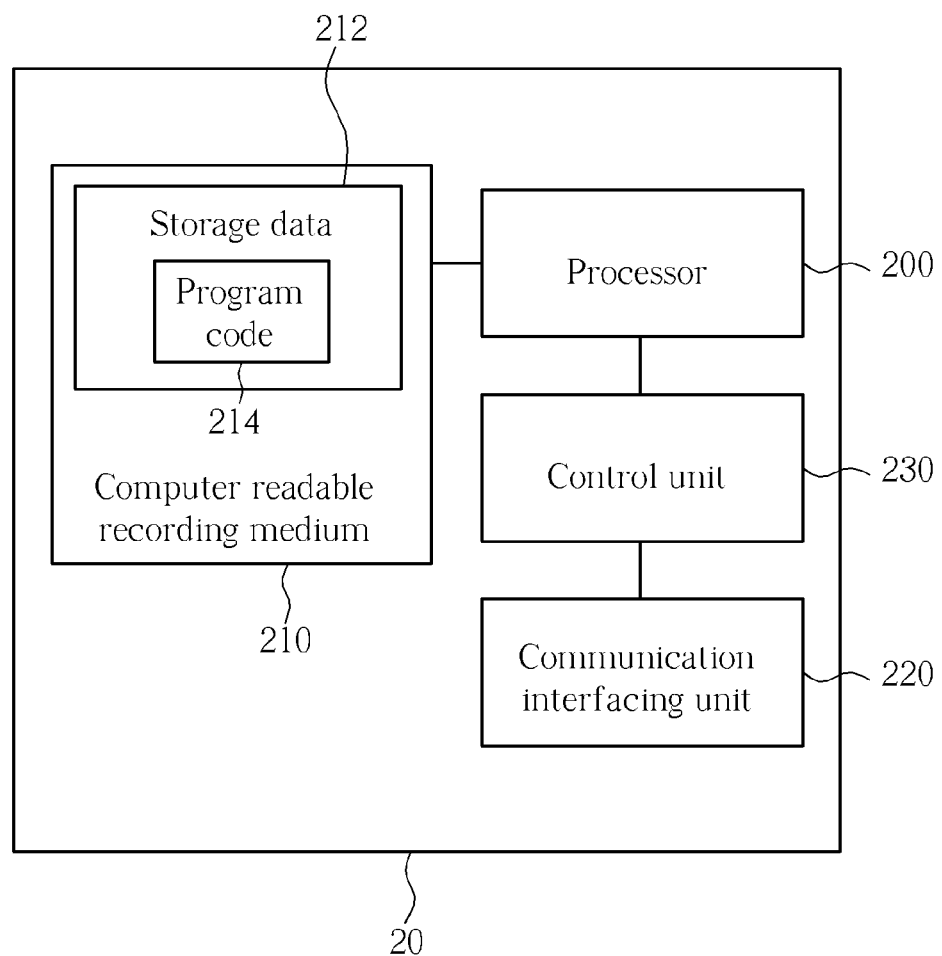
FIG. 2 is a schematic diagram of a communication device according to an example of the present invention.

Please refer to FIG. 2, which is a schematic diagram of a communication device 20 according to an example of the present invention. The communication device 20 can be the UE shown in FIG. 1 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 3:
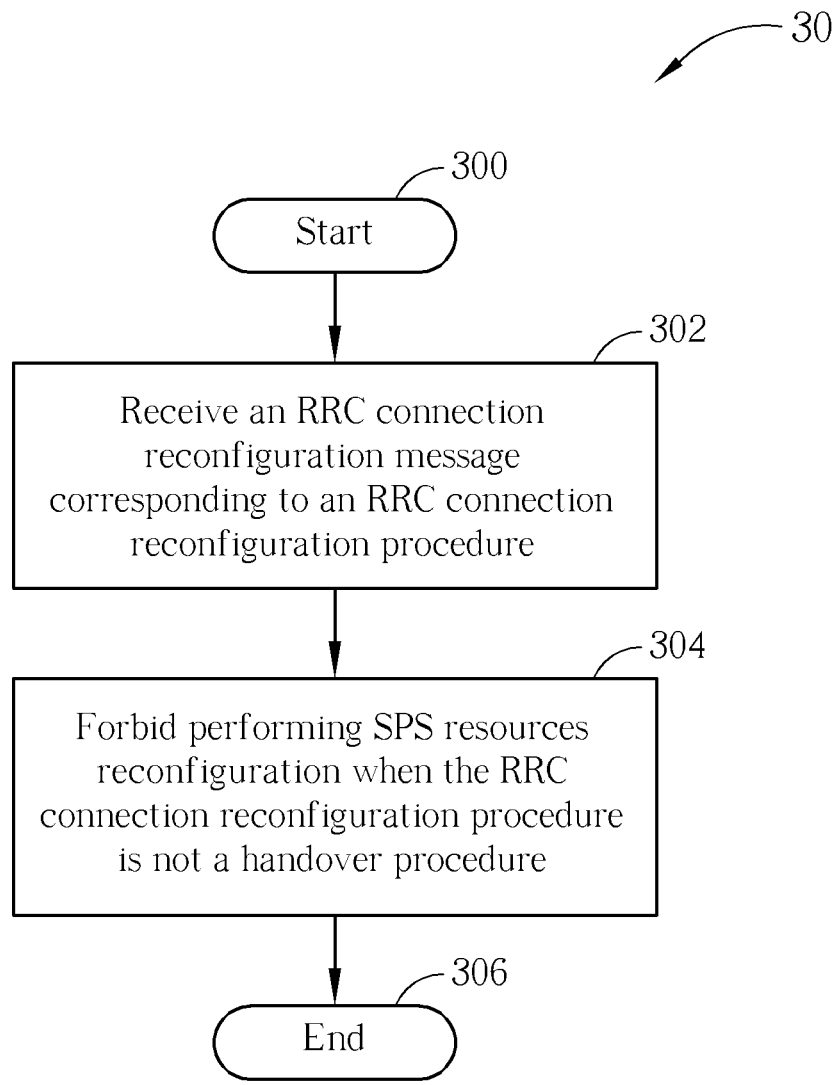
FIG. 3 and FIG. 4 are flowcharts of processes according to examples of the present invention.

Please refer to FIG. 3, which is a flowchart of a process 30 according to an example of the present invention. The process 30 is also utilized for improving semi-persistent scheduling (SPS) resources reconfiguration and can be compiled into the program code 214. The process 30 includes the following steps:

Step 300: Start.

Step 302: Receive an RRC connection reconfiguration message corresponding to an RRC connection reconfiguration procedure.

Step 304: Forbid performing SPS resources reconfiguration when the RRC connection reconfiguration procedure is not a handover procedure.

Step 306: End.

For the reason that the UE may decode transport blocks unsuccessfully when SPS resources reconfiguration is not exactly performed in the non-handover RRC connection reconfiguration procedure, the process 30 simply forbids performing SPS resources reconfiguration when the RRC connection reconfiguration procedure is not a handover procedure, and therefore the timing issue is avoided. In other words, the process 30 allows SPS resources reconfiguration to be performed only in the handover procedure. Note that in current specification, whether the RRC connection reconfiguration procedure is the handover procedure depends on the received RRC connection reconfiguration message including the IE "mobilityControlInformation" or not.

Figure 4:
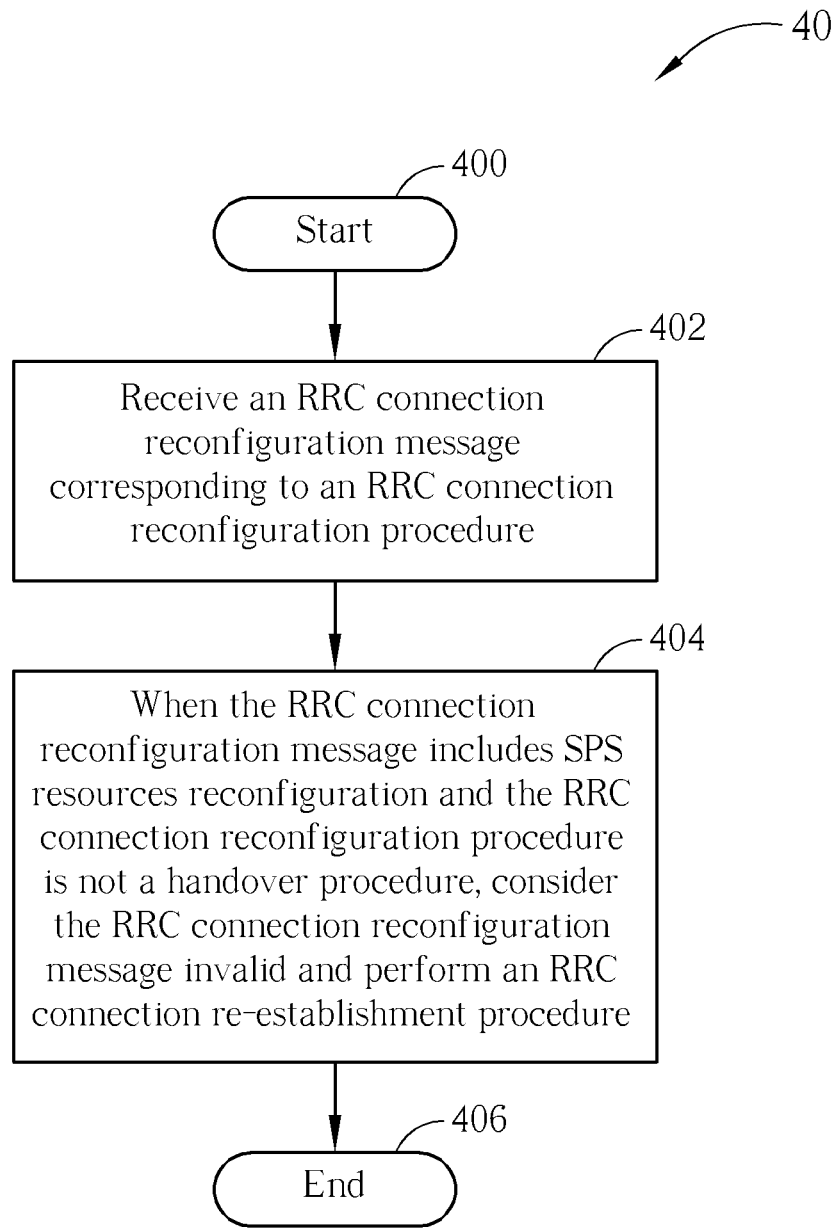

Furthermore, please refer to FIG. 4, which is a flowchart of a process 40 according to an example of the present invention. The process 40, similar to the process 30, aims to prevent SPS resources reconfiguration being performed in the non-handover RRC connection reconfiguration procedure. The process 40 can be compiled into the program code 214, which includes the following steps:

Step 400: Start.

Step 402: Receive an RRC connection reconfiguration message corresponding to an RRC connection reconfiguration procedure.

Step 404: When the RRC connection reconfiguration message includes SPS resources reconfiguration and the RRC connection reconfiguration procedure is not a handover procedure, consider the RRC connection reconfiguration message invalid and perform an RRC connection re-establishment procedure.

Step 406: End.

According to the process 40, when the received RRC connection reconfiguration message includes SPS resources reconfiguration and does not include the IE "mobilityControlInformation", which intends that the RRC connection reconfiguration procedure is not the handover procedure, the UE acts for preventing SPS resources reconfiguration being performed. The first thing the UE does is to consider the RRC connection reconfiguration message invalid, so that the RRC connection reconfiguration procedure is fail to complete; and later, the UE performs the RRC connection re-establishment procedure to re-establish RRC connection in order to recover the RRC connection reconfiguration failure.

In other words, the process 40 does not allow SPS resources reconfiguration being performed in the RRC connection reconfiguration procedure which is not the handover procedure even though the RRC connection reconfiguration message includes SPS resources reconfiguration. Thus SPS resources reconfiguration is performed only in the handover procedure.

In conclusion, the present invention provides complete behavior of SPS resources reconfiguration for the UE so that SPS resources reconfiguration is exactly performed in any case and the timing issue is avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving semi-persistent scheduling, abbreviated to SPS, resources reconfiguration for a user equipment in a wireless communication system, the method comprising:

receiving a radio resource control, abbreviated to RRC, connection reconfiguration message corresponding to an RRC connection reconfiguration procedure; and forbidding performing SPS resources reconfiguration when the RRC connection reconfiguration procedure is not a handover procedure, to avoid decoding transport blocks unsuccessfully.

2. A method of improving semi-persistent scheduling, abbreviated to SPS, resources reconfiguration for a user equipment in a wireless communication system, the method comprising:

receiving a radio resource control, abbreviated to RRC, connection reconfiguration message corresponding to an RRC connection reconfiguration procedure; and when the RRC connection reconfiguration message includes SPS resources reconfiguration and the RRC connection reconfiguration procedure is not a handover procedure, considering the RRC connection reconfiguration message invalid and performing an RRC connection re-establishment procedure, to prevent the SPS resources reconfiguration from being performed in the non-handover RRC connection reconfiguration procedure.

* * * * *